United States Patent
Woodruff

[11] Patent Number: 6,050,309
[45] Date of Patent: Apr. 18, 2000

[54] VALVE ASSEMBLY FOR USE WITH CONTAINERS IN A CLOSED APPLICATION SYSTEM

[75] Inventor: Keith F. Woodruff, Mountainside, N.J.

[73] Assignee: American Cyanamid Company, Madison, N.J.

[21] Appl. No.: 09/015,835

[22] Filed: Jan. 29, 1998

Related U.S. Application Data

[60] Provisional application No. 60/036,618, Jan. 30, 1997.

[51] Int. Cl.[7] .......................................... B65B 1/04
[52] U.S. Cl. .......................... 141/346; 141/351; 141/352; 141/354; 141/364
[58] Field of Search ............................. 141/18, 346, 351, 141/352, 353, 354, 355, 364; 251/212

[56] References Cited

U.S. PATENT DOCUMENTS

| | | | |
|---|---|---|---|
| 1,226,722 | 5/1917 | Sullivan | 141/346 |
| 1,506,919 | 9/1924 | Corkran et al. | |
| 1,770,576 | 7/1930 | Leather | 141/346 |
| 1,970,451 | 8/1934 | Gottlieb | |
| 1,997,837 | 4/1935 | Taurman | |
| 2,944,707 | 7/1960 | Steinmetz | |
| 3,180,537 | 4/1965 | Collins | |
| 3,317,087 | 5/1967 | Landis | |
| 3,325,844 | 6/1967 | Lampe | |
| 3,446,403 | 5/1969 | Serio | 222/158 |
| 4,105,142 | 8/1978 | Morris, Jr. | |
| 4,356,848 | 11/1982 | Spies | |
| 4,402,433 | 9/1983 | Webinger | |
| 4,746,034 | 5/1988 | Ata et al. | |
| 5,029,624 | 7/1991 | McCunn et al. | |
| 5,060,701 | 10/1991 | McCunn et al. | |
| 5,119,972 | 6/1992 | Reed et al. | 222/143 |
| 5,125,438 | 6/1992 | McCunn et al. | |
| 5,224,527 | 7/1993 | McCunn et al. | |
| 5,294,014 | 3/1994 | Wyatt et al. | |
| 5,379,812 | 1/1995 | McCunn et al. | |
| 5,484,004 | 1/1996 | Bolz | |
| 5,515,143 | 5/1996 | Shiotani | 141/364 |
| 5,551,606 | 9/1996 | Rai et al. | 141/364 |
| 5,641,012 | 6/1997 | Silversides | 141/346 |
| 5,715,877 | 2/1998 | Sandor | 141/351 |
| 5,967,383 | 10/1999 | Hidalgo | |

FOREIGN PATENT DOCUMENTS

| | | |
|---|---|---|
| 5171 | 9/1995 | Costa Rica . |
| 685155 | 12/1995 | European Pat. Off. . |
| 1037678 | 9/1953 | France . |

*Primary Examiner*—Henry J. Recla
*Assistant Examiner*—Timothy L. Maust
*Attorney, Agent, or Firm*—Charles F. Costello, Jr.

[57] ABSTRACT

A container for use in a closed application system includes a valve mounted to a discharge opening of the container and rotatable with the container for controlling the discharge of material from the container. The valve includes an element for engaging corresponding structure in a receptacle for receiving the contents of the container. The element engages and locks the valve in the receptacle when the valve is opened and the contents are being discharged from the container into the receptacle. The valve element and the corresponding structure on the receptacle cooperate so that the container can only be received in and removed from the receptacle when the valve is closed. In this manner, the contents in the container can be discharged only when the container is received within the receptacle and the container is rotated in a direction to open the valve.

19 Claims, 11 Drawing Sheets

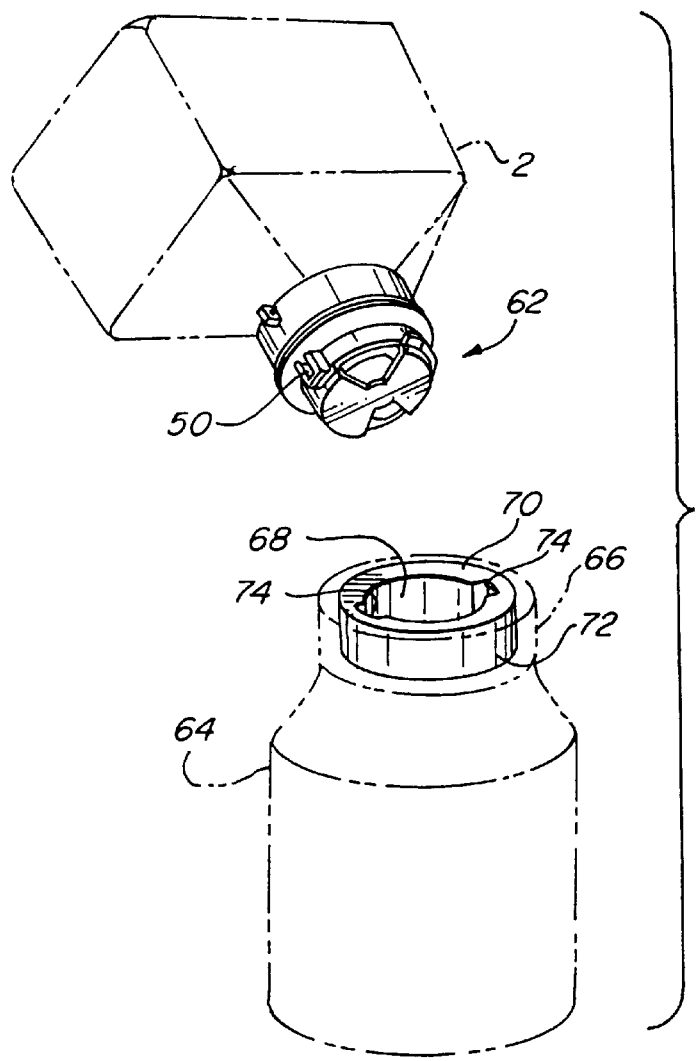
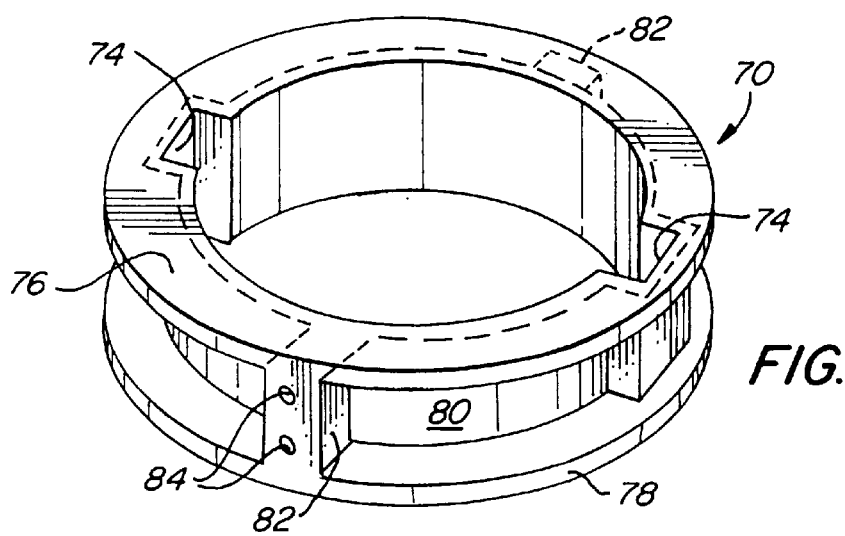
FIG. 9
FIG. 10

VALVE ASSEMBLY FOR USE WITH CONTAINERS IN A CLOSED APPLICATION SYSTEM

This application claims priority from copending provisional application serial No. 60/036,618 filed on Jan. 30, 1997.

BACKGROUND OF THE INVENTION

The present invention is directed to an improved container, and in particular an improved container system for use in connection with a closed application system such as those used for the handling of chemical agents, and in particular agricultural treatment agents. A closed application system avoids direct contact with agricultural agents by personnel handling the agricultural agents.

U.S. Pat. No. 5,119,972 issued on Jun. 9, 1992 and entitled "Container For Supplying Agricultural Treatment Agents In A Closed Application System" discusses the desirability of a closed application system for personnel handling agricultural agents to be dispensed by agricultural equipment. During the course of an agricultural treatment procedure, it is usually necessary to refill the dispensing equipment with additional treatment material to replenish the supply that has been exhausted. Refill of material is accomplished by pouring material from a container, such as the container disclosed in U.S. Pat. No. 5,119,972, into the dispensing equipment. The dispensing equipment includes apparatus which are self-powered or driven by an operator, such as the equipment disclosed in U.S. Pat. Nos. 5,029,624; 5,060,701; 5,379,812; 5,224,527; and 5,125,438. Agricultural material can also be dispensed from receptacles worn by the agricultural workers, as for example, treatment material discharged from hoses coupled to backpacks containing the treatment material which are worn by agricultural workers.

U.S. Pat. Nos. 5,484,004; 4,356,848; and 4,105,142 generally disclose systems for transferring product from one container to another by gravity feed. U.S. Pat. No. 3,446,403 also generally discloses a valve system including rotatable valve means for transferring product from one container to another. U.S. Pat. Nos. 1,770,576; 1,970,451; 1,997,837 and 3,325,844 are exemplary of known systems having rotatable valve means for selectively rotating components relative to each other for aligning corresponding openings to permit flow of material from a container. Published Costa Rican Patent Specification No. 5171 discloses a known closed application system for transferring agricultural products by gravity feed from a storage container, through a rotatably actuated valve assembly in which valve components have been rotated to align corresponding openings, and into a pump for dispensing the product transferred from the container.

It is the primary object of the present invention to provide an improved system for transferring agricultural treatment agents in a closed application system including a storage container, a receptacle for receiving product from the storage container, guide means for removably coupling the container to the receptacle, and rotatably actuated valve means for selectively controlling the flow of product from the container and into the receptacle. The improvement of the present invention provides means by which a product container is efficiently guided into a receptacle for refilling the receptacle, means for permitting the container to be received in or removed from the receptacle only when a discharge valve on the container is in a closed position, stop means for limiting relative rotation of the valve means, and locking means for preventing uncoupling of the container from the receptacle when the valve is in an opened position.

Other objects and advantages of the present invention will become apparent from the following description thereof.

SUMMARY OF THE INVENTION

A container for storing material, and in particular liquid or granular agricultural treatment material, includes a discharge opening defined at the top thereof. A valve assembly is removably mounted over the discharge opening, and the valve is normally biased into a closed position for preventing discharge of material from the container through the discharge opening. The valve is selectively movable into an opened position when material is to be discharged from the container. The top of the container, including the discharge nozzle and the valve assembly, is adapted to be removably received within a supporting element mounted proximate to the top of a receptacle, when the container is placed in an inverted position. The valve assembly on the container and the supporting element in the receptacle include complementary guide means for removably mounting the container within the receptacle. No material is initially discharged from the inverted container into the receptacle because the valve over the discharge opening is in a closed position.

When the valve assembly of the container is received in the supporting element in the receptacle, the container is rotated relative to the receptacle to move the valve from a closed position to an opened position to permit material within the container to flow into the receptacle by gravity feed. Locking means movable with the valve engage the supporting element of the receptacle simultaneously with the rotation of the valve into its opened position to prevent removal of the container from the receptacle when the valve is in an opened position. Removal of the container is accomplished by rotating the container relative to the supporting element in the receptacle to move the valve into its closed position which simultaneously disengages the locking means from the supporting element of the receptacle. The valve is now in it closed position, and the container can be removed from the receptacle without discharging any material remaining in the container. The locking means also cooperates with the valve assembly to provide stop means for limiting the maximum relative rotation of the valve in first and second opposed directions as the valve is moved between closed and opened positions.

The container and the valve assembly mounted thereto cooperate with the receptacle and the supporting element mounted therein to permit refill of the receptacle with material from the inverted container without discharging material from the container before it is received in the receptacle or after it is removed from the receptacle. The valve assembly, which is removably mounted over the discharge outlet of the container, remains in a closed position at all times other than when the container is received within the receptacle for refilling the receptacle. Accordingly, the container with the valve mounted thereon can be safely handled and stored by agricultural workers before and after refilling procedures.

In a further aspect of the invention, the container includes at least one tab extending from the outer container surface, and the tab has an opening defined therein. The opening is adapted to receive a hook or other supporting element so that the container can be transported from one location to another by a cable or conveyor type transport system.

BRIEF DESCRIPTION OF THE DRAWINGS

FIGS. 8A and 8B illustrate a second embodiment of the invnetion in which FIG. 8A is a top plan view of a modified valve assembly in its closed position, and FIG. 8B illustrates this modified valve assembly in its opened position;

FIG. 9 is a perspective view schematically illustrating the relationship between a container with a valve assembly in accordance with the first embodiment of the present invention mounted thereto, and a receptacle having an inlet collar in accordance with the first embodiment of the present invention for receiving the contents of the container;

FIG. 10 is a perspective view of the collar mounted to the inlet of the receptacle illustrated by FIG. 9 in accordance with the first embodiment of the present invention;

DESCRIPTION OF THE BEST MODES FOR CARRYING OUT THE INVENTION

The improved container system of the present invention will now be discussed with respect to FIGS. 1–17 of the drawings.

Figure 1:
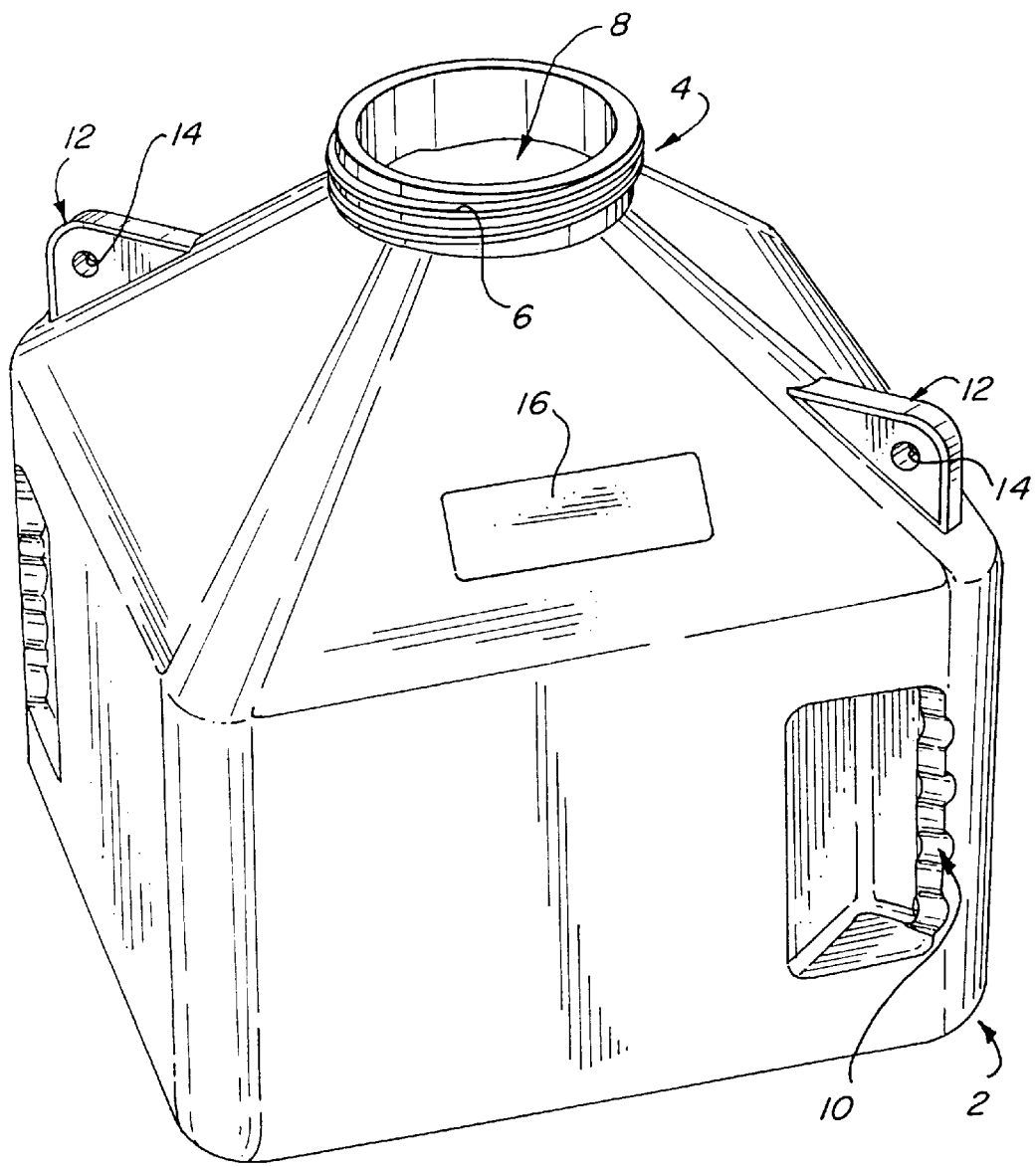
FIG. 1 is a perspective view of a container in accordance with the present invention in an upright position.
Figure 2:
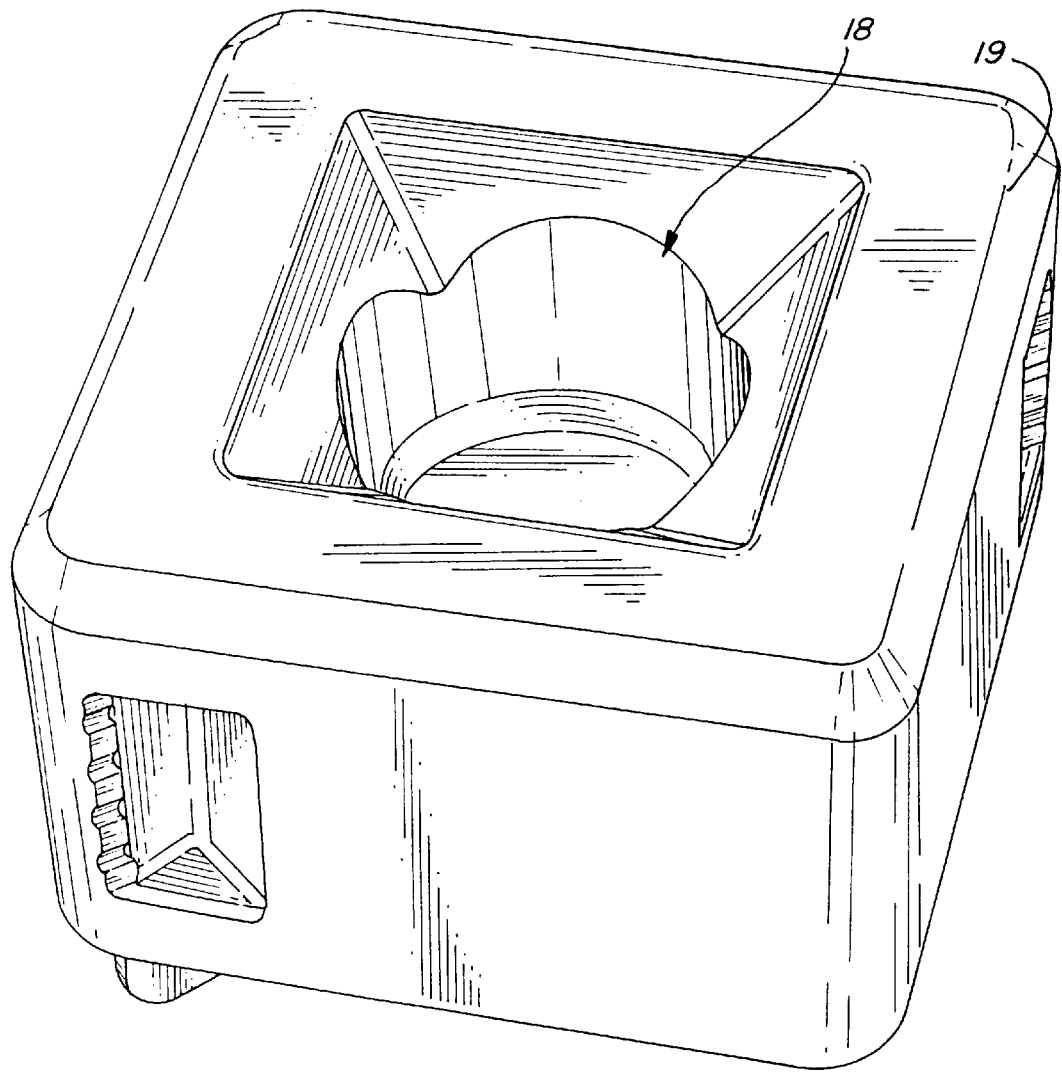
FIG. 2 is a pespective view of the container illustrated by FIG. 1 in an inverted position.

FIGS. 1–2 illustrate a container in accordance with the present invention generally designated by reference numeral 2. The container includes a nozzle 4 located at the top end of the container, and the nozzle includes external threading designated by reference numeral 6. A discharge outlet designated by reference numeral 8 is defined by the nozzle 4. The container also includes recessed portions defining handle grips 10 on the outer surface thereof, tabs 12 defining openings 14 therein, and a panel section 16 for displaying printed information on the container, as for example, the identification of the container contents and/or warning notices.

FIG. 2 illustrates the bottom surface 19 of the container 2 illustrated by FIG. 1. A centrally disposed, recessed area 18 is defined in the bottom surface of the container. The recessed area 18 is provided for receiving the nozzle 4 of a similar container stacked beneath container 2. The recess 18 is configured to receive a valve assembly (to be discussed below) removably mounted to the nozzle of the lower stacked container. The recess 18 is also configured so that the weight and mechanical stress applied by the upper container to a lower stacked container is displaced from the valve assembly mounted to the nozzle of the lower container.

Figure 3:
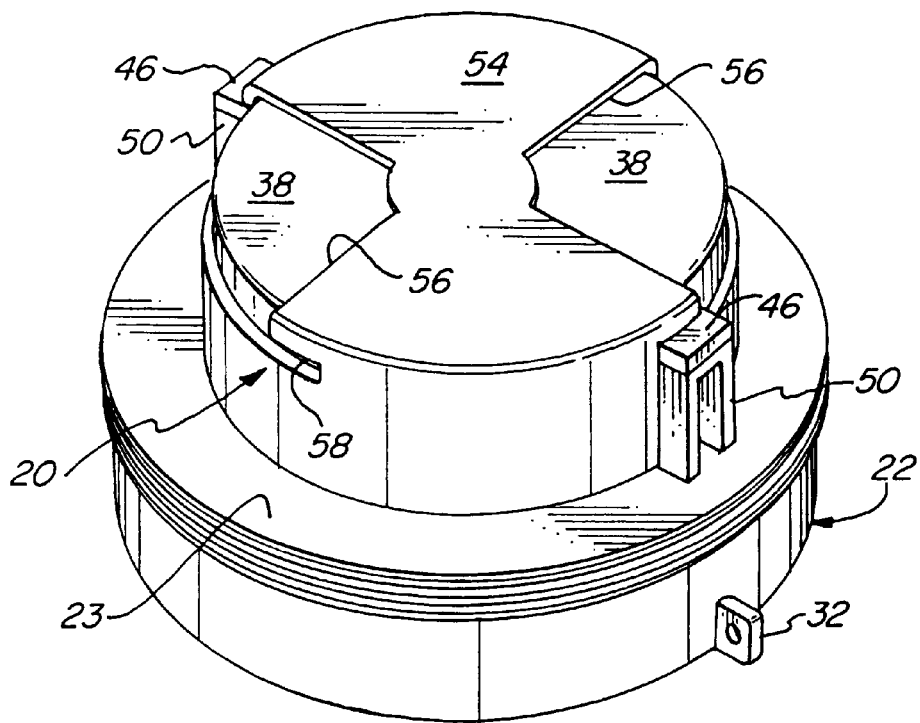
FIG. 3 is a perspective view of a valve assembly, in accordance with a first embodiment of the invention, removably mountable over a discharge opening in the container illustrated by FIG. 1, the valve assembly being shown in a closed position.
Figure 4:
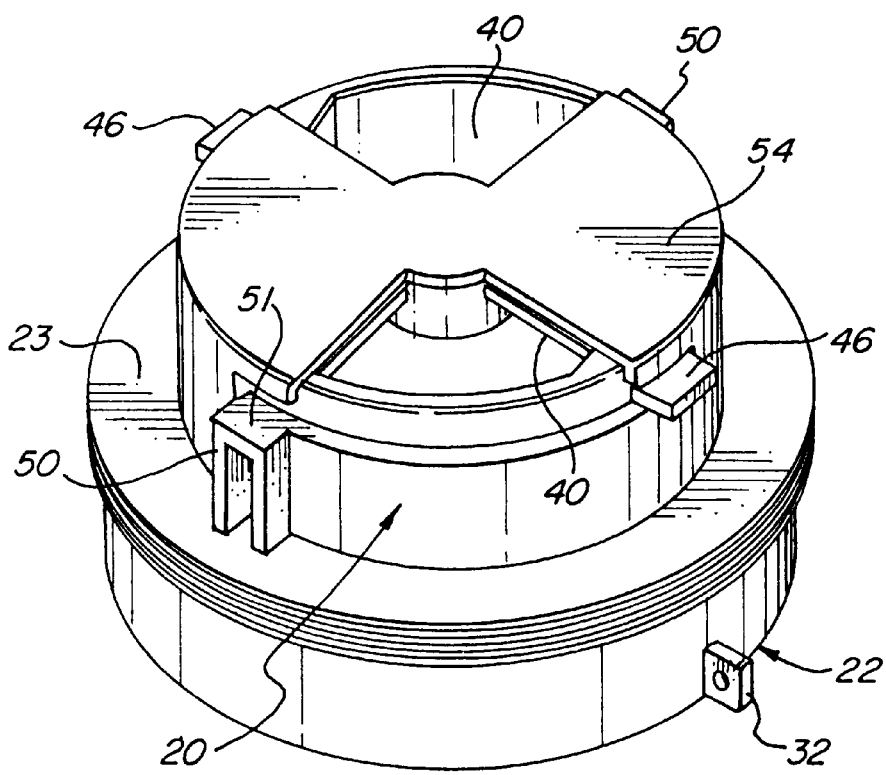
FIG. 4 illustrates the valve assembly shown in FIG. 3, the valve assembly being shown in a fully opened position.

FIG. 3 illustrates a valve assembly in accordance with the present invention in a closed position. FIG. 4 illustrates the valve assembly of FIG. 3 in an opened position. The valve assembly includes a valve housing generally designated by reference numeral 22 and a valve cap generally designated by reference numeral 20 mounted to the valve housing. The valve housing and the valve cap are mounted to be rotatably movable relative to each other. Appropriate seal means, as for example, an O-ring (not shown), is provided to seal the areas at which the valve cap engages the valve housing. Internal threads (not shown) are defined on the inner surface of the lower, wider flange portion 23 of the valve housing 22. In this manner, the valve housing is threadable on the external threads 6 around the nozzle 4 of the container 2 (see FIG. 1) to removably mount and dismount the valve assembly over the discharge outlet 8 of the container 2. The top surface of the valve assembly is preferably sloped downwardly in an outward direction to permit materials, including liquids (for example—rainwater) which accumulates on the top surface thereof, to run off.

Figure 6:
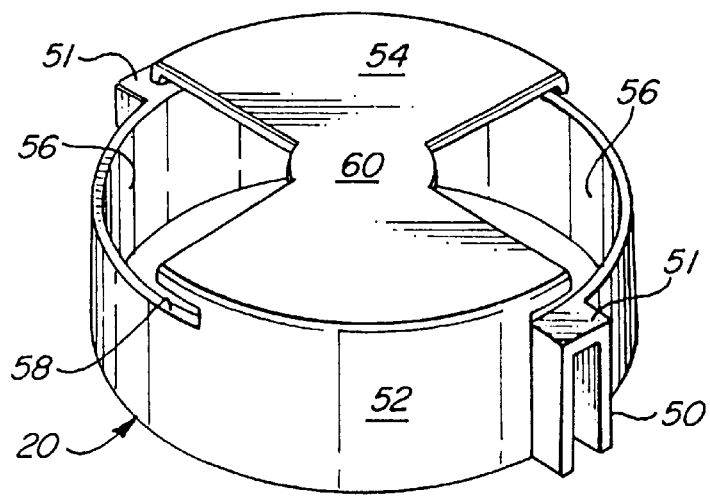
FIG. 6 is a perspective view of a valve cap mountable over the valve housing illustrated by FIG. 5.
Figure 5:
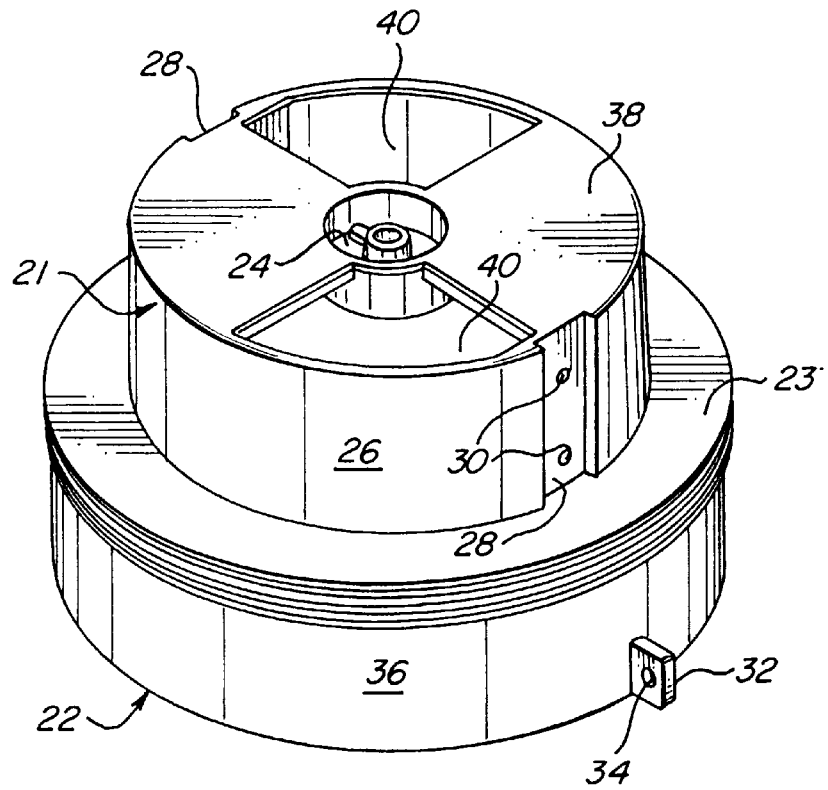
FIG. 5 is a perspective view of a valve housing of the valve assembly illustrated by FIGS. 3 and 4.

The valve housing 22 illustrated in FIGS. 3 and 4 is shown separated from the valve cap 20 in FIG. 5. FIG. 6 illustrates the valve cap 20 separated from the valve housing 22. The valve housing includes an upper hub portion 21 and a lower, wider diameter flange portion 23 (As noted above, the wider flange portion 23 defines internal threading for removably mounting the valve housing to the nozzle portion of the container 2). The narrower diameter, hub portion 21 of the valve housing 22 defines a central opening 24 for receiving therein a resilient element, as for example a clock spring. The outer surface 26 of the hub 21 defines two vertical grooves 28, each of which define two mounting openings 30. At least one tab 32 having a central opening 34 extends outwardly from the outer surface 36 of the wider diameter flange portion 23 of the valve housing 22. As most clearly illustrated by FIG. 5, the top surface 38 of the hub 21 of the valve housing defines two openings 40 therein.

Figure 7A:
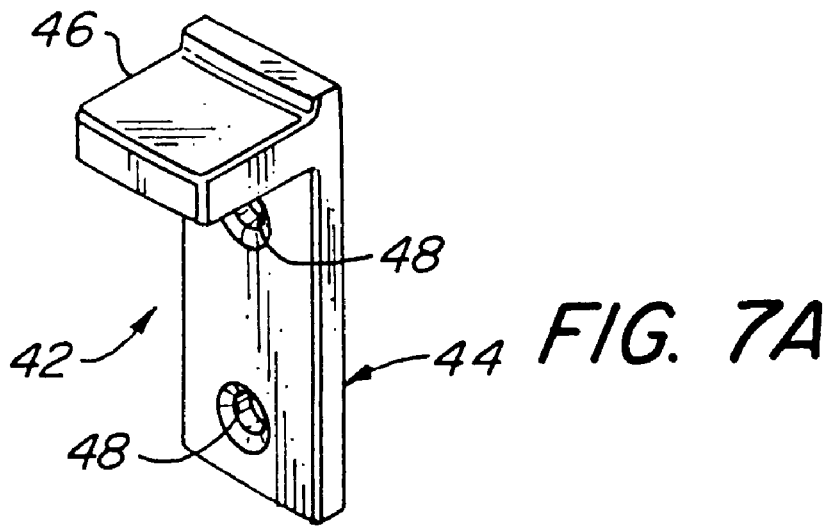
FIG. 7A is a perspective view of a tab element mountable to the valve housing illustrated by FIG. 5.
Figure 7B:
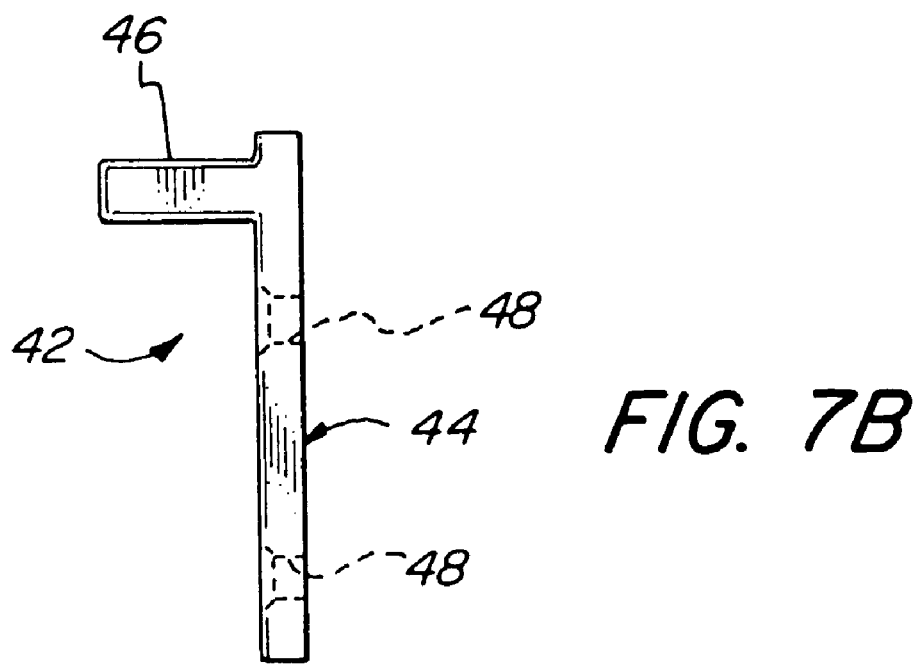
FIG. 7B is a side elevational view of the tab illustrated by FIG. 7A.

FIGS. 7A and 7B illustrate an L-shaped element generally designated by reference numeral 42. Element 42 includes a vertical portion 44 and a horizontal portion 46 integrally extending from the top of the vertical portion and oriented substantially perpendicular thereto. The vertical portion 44 defines two mounting openings 48 therein. The vertical portion 44 of element 42 is received within the vertical groove 28 in the outer surface 26 of the hub portion 21 of the valve housing 22 (see FIG. 5). The openings 30 in the vertical groove 28 are aligned with the openings 48 in the vertical portion 44 of element 42 so that the element 42 is mountable in the groove 28 by passing screws or rivets through the aligned openings 30 and 48, respectively. As will be discussed below, element 42 is mounted to the hub so that the horizontally extending portion 46 is oriented to face outwardly from the hub 21.

FIG. 6 illustrates the valve cap 20 as shown in FIGS. 3–4, removed from the valve housing 22. The valve cap includes two diametrically opposed ribs 50 extending outwardly from the outer surface 52 of the valve cap 20. The upper surface 54 of the valve cap 20 includes two openings 56 which are formed in the same size and shape as the openings 40 defined in the top surface of the valve housing 22 (see FIG. 5). The upper portion of the sidewall 52 of the valve cap 20 defines two circumferential grooves or slots 58 proximate to the outer peripheral portions of the openings 56. One end of each of the slots 58 is defined above the top surface 51 of a different one of the ribs 50 on the valve cap. The center portion 60 of the top surface 54 is oriented such that it covers the central opening 24 defined in the top surface 38 of the valve housing 22 (see FIG. 5), when the valve cap 20 is rotatably mounted to the valve housing 22, as will be discussed herein.

Referring back to FIG. 3, this drawing illustrates the valve cap 20 (FIG. 6) mounted to the valve housing 22 (FIG. 5), showing the overall valve assembly in a closed position in which the respective openings 40 and 56 on the top surfaces of the valve housing and valve cap are completely offset and out of alignment such that the top surface of the overall valve assembly is closed. The valve cap 20 is mounted over the hub portion 21 of the valve housing 22 such that the valve housing and the valve and the valve cap are rotatable to each other. As further illustrated by FIG. 3, element 42 (See FIG. 7) is mounted in the groove 28 of the hub portion 21 of the valve housing, and the horizontally extending tab portion 46 of the element 42 is oriented above the top surface 51 of the rib 50 extending from the sidewall 52 of the valve cap 20. The tab 46 is movable along the circumferential slot 58 defined between the top surface 38 of the hub 21 of the valve housing and the top surface 54 of the valve cap.

Referring again to FIG. 4, this drawing illustrates the valve assembly of FIG. 3 in its opened position. The valve housing 22 is rotated relative to the valve cap 20 so that the openings 40 and 56 in the top surfaces of the valve housing and valve cap, respectively, are aligned (or partially aligned) with each other to define the two openings in the top surface of the overall valve assembly illustrated by FIG. 4. Rotation of the valve housing relative to the valve cap causes the tab 46, fixedly mounted to the valve housing and rotatable therewith to be moved along the circumferential groove or slot 58 of the overall valve assembly. The remote end of the slot (i.e., the end oriented away from the rib 50) acts as a stop to limit the maximum rotation of the valve assembly relative to the valve cap to the position shown by FIG. 4 in which the respective openings 40 and 56 are in complete alignment with each other and thus the valve assembly is in its maximum opened position.

In the embodiment of the invention illustrated by FIGS. 3 and 4, the valve assembly includes two tabs 46 equidistantly spaced along the circumference of the valve housing, and two slots 58 of equal length for receiving the two tabs 46. The tabs and slots are operatively arranged and oriented so that relative movement of each tab from a first end of each slot to a second end of each slot moves the valve from a fully closed position to a fully opened position, and relative movement of each tab from the second end of each slot back to the first end of each slot returns the valve to a fully closed position. The valve housing can also be rotated relative to the valve cap into intermediate positions in which the openings 40 and 56 are in partial, but not complete, alignment with each other. In this manner, the size of the openings defined in the top surface of the overall valve assembly illustrated by FIGS. 3 and 4 is selectively variable to control the rate of flow of material from the container 2 (see FIG. 1) when the valve assembly is mounted over the discharge outlet 8 of the container 2 and the container is inverted, as will be discussed below. Accordingly, rotational movement of the valve housing relative to the valve cap selectively controls the operation of the valve between a fully closed position as illustrated by FIG. 3, a fully opened position as illustrated by FIG. 4, and partially opened positions which are intermediate to those illustrated by FIGS. 3 and 4. As noted above, the tab 46 received in the circumferential slot 58 defined between the valve housing and the valve cap acts as a stop to limit the maximum relative movement between the valve housing and the valve cap towards the closed valve position illustrated by FIG. 3 when moved in a first direction, and to limit the maximum relative movement of the valve housing and valve cap towards the fully opened position as illustrated by FIG. 4 when moved in a second direction opposite the first direction.

Figure 8A:
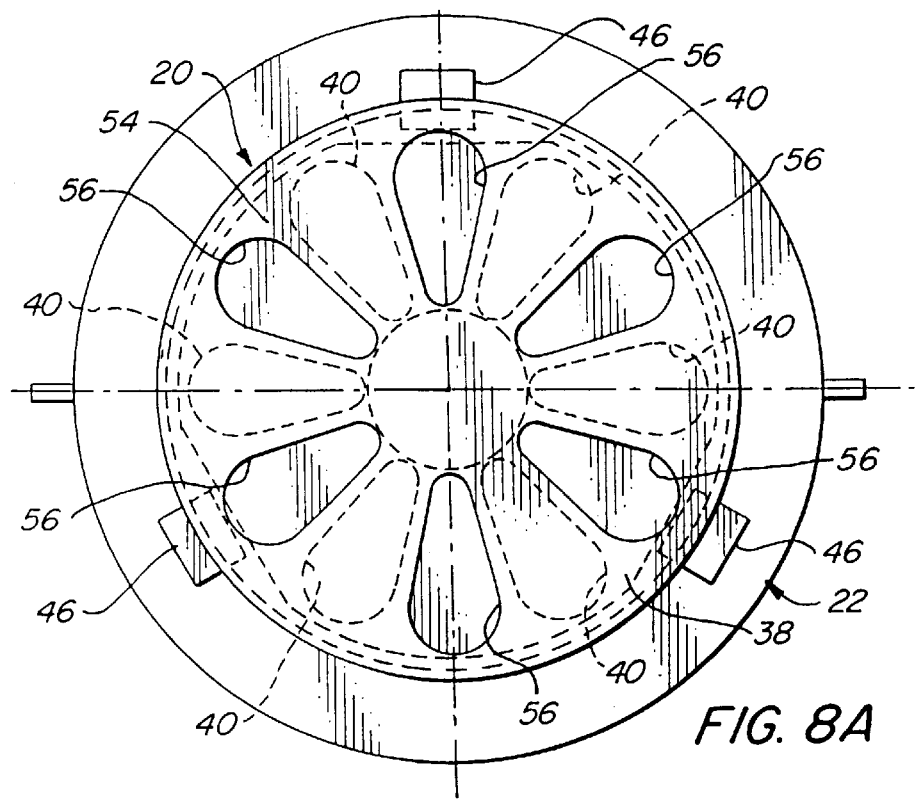
Figure 8B:
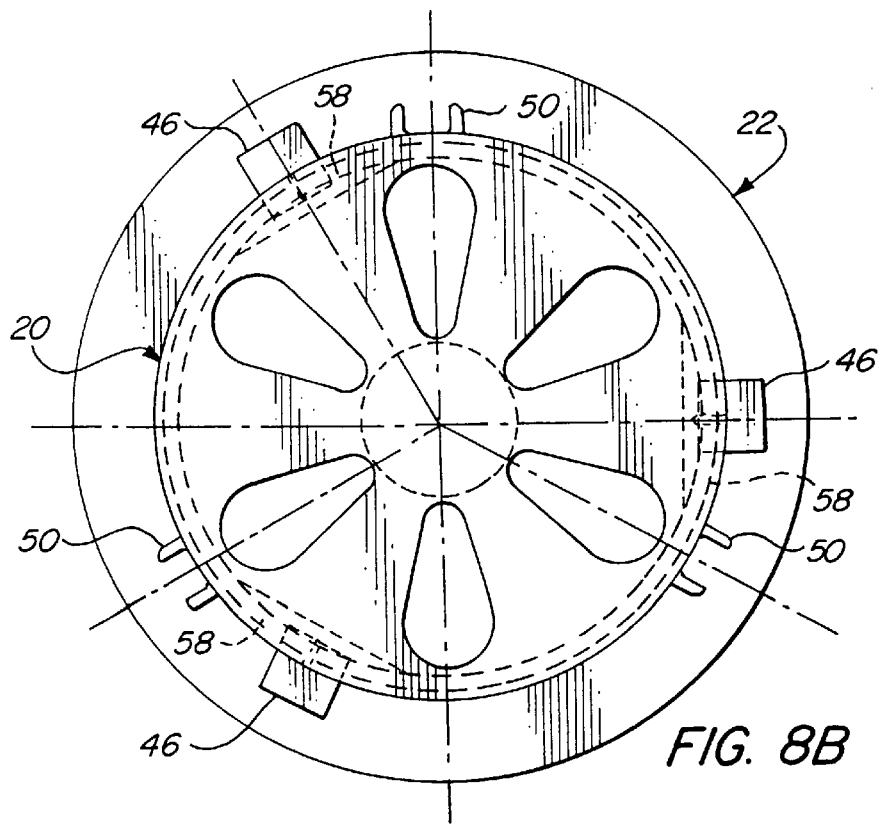
Figure 11A:
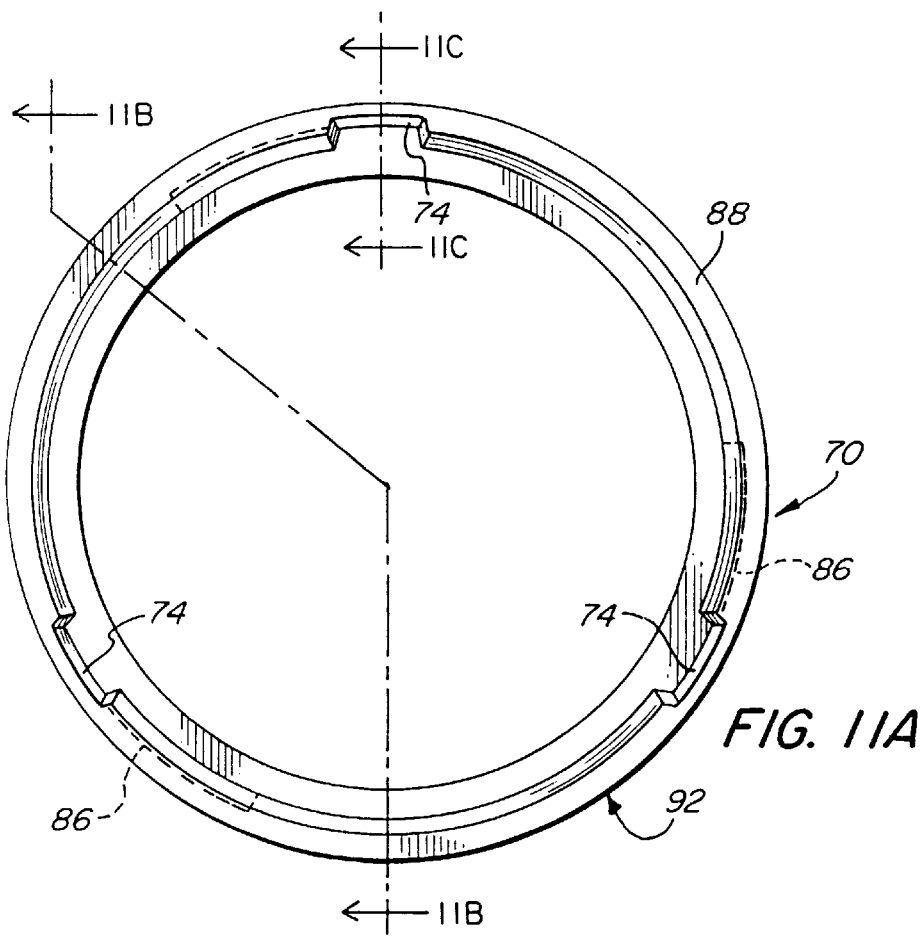
FIG. 11A is a top plan view of a modified collar in accordance with the second embodiment of the present invention illustrated by FIGS. 8A and 8B.
Figure 11B:
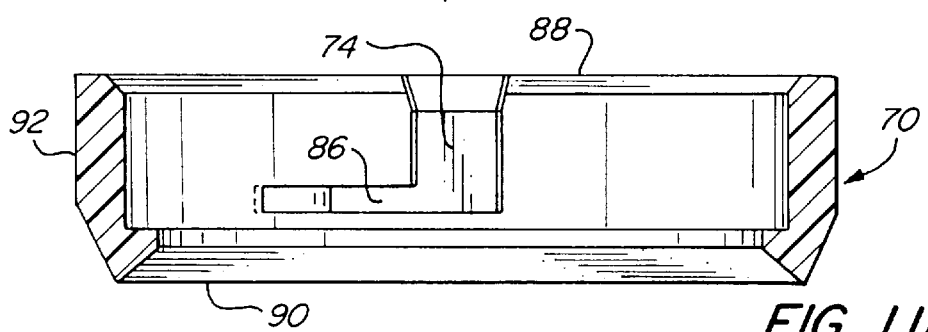
FIG. 11B is a section taken along directional arrows 11B—11B.
Figure 11C:
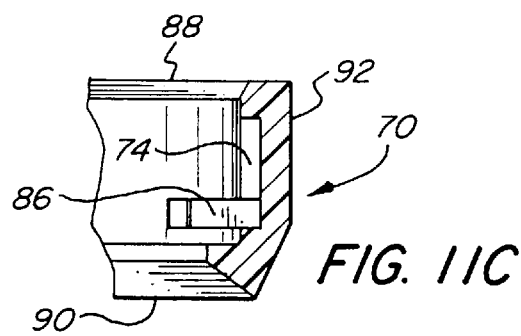
FIG. 11C is a section taken along directional arrows 11C—11C.
Figure 12:
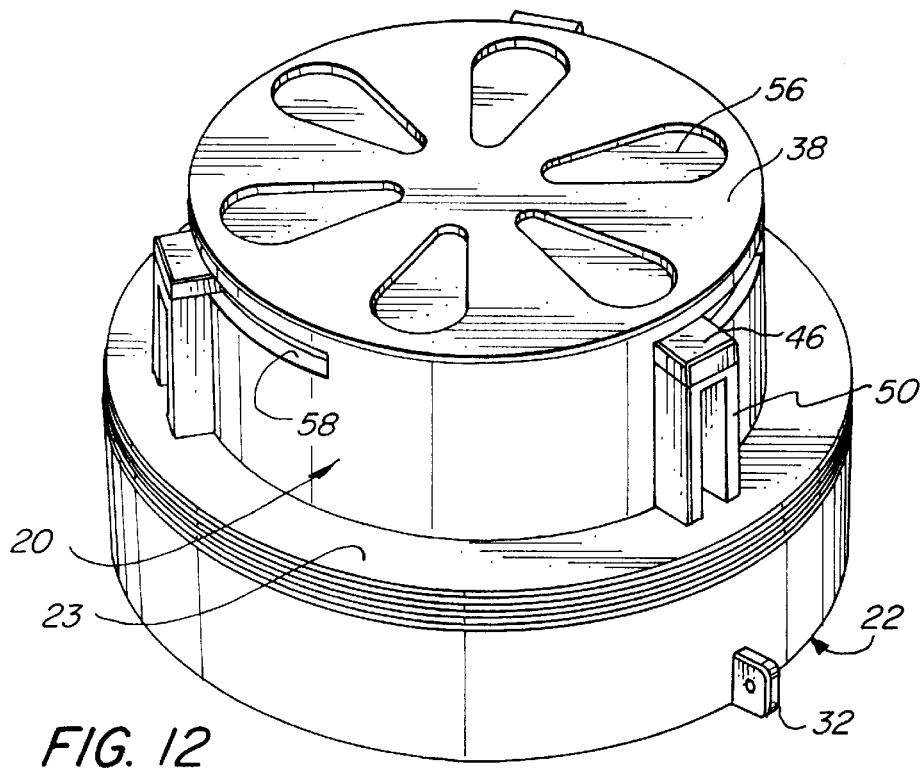
FIG. 12 is a perspective view of a valve assembly, in accordance with the second embodiment of the present invention, removably mountable over a discharge opening in the container illustrated by FIG. 1, the valve assembly being shown in a closed position.
Figure 13:
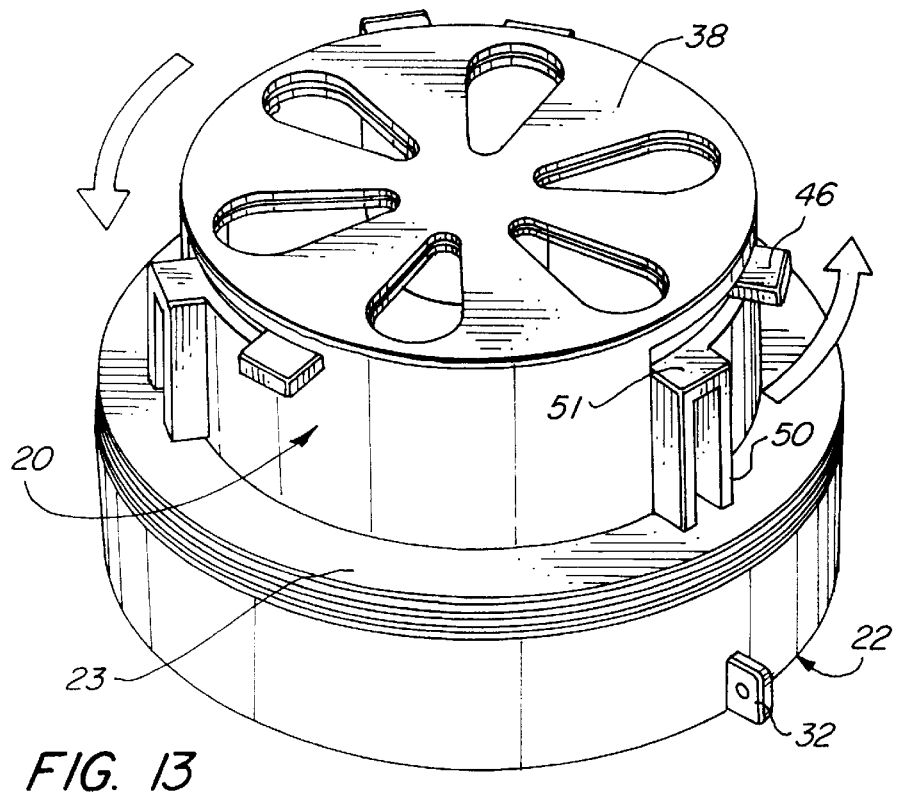
FIG. 13 illustrates the valve assembly shown in FIG. 12, the valve assembly being shown in a fully opened position.
Figure 14:
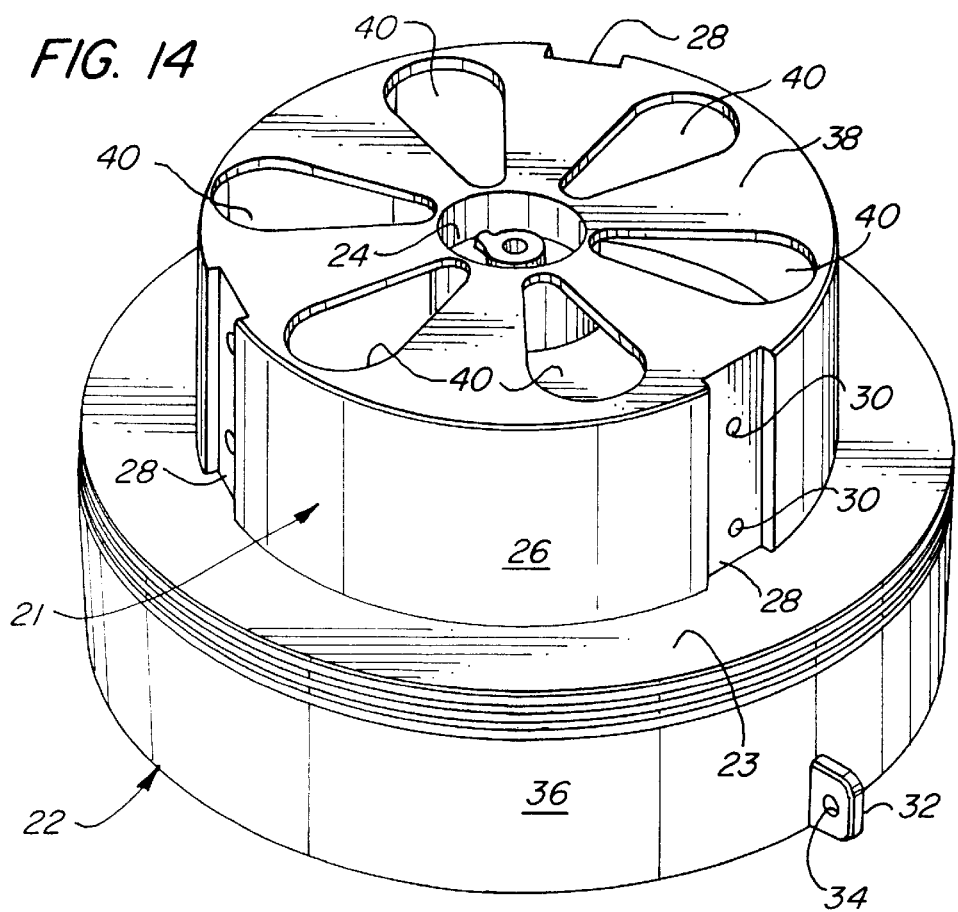
FIG. 14 is a perspective view of the valve assembly illustrated by FIGS. 12 and 13.

FIGS. 8A–8B, 11A–11C and 12–17 illustrate a slightly modified embodiment of the valve assembly. Corresponding elements are designated by the same reference numerals used in FIGS. 1–7 and 9–10. FIGS. 8A and 12 illustrate the valve assembly in a closed position. Six "tear-drop" shaped openings 56 are defined in the top surface 54 of the valve cap 20, and six identically shaped openings 40 are defined in the top surface 38 of the valve housing 22. The valve housing carries three tabs 46 extending in an outward direction, and the valve cap carries 3 equidistantly spaced ribs 50 on its outer surface. As illustrated by FIGS. 8A and 12, the valve housing is oriented relative to the valve cap such that the openings 40 and 56 are completely out of alignment to result in a closed upper surface of the overall valve assembly. The valve is therefore in its closed position. FIGS. 8B and 13 illustrate the valve assembly of FIGS. 8A and 12 in a fully opened position. The valve housing is rotated relative to the valve cap so that the openings 40 and 56 are in complete alignment with each other to define six openings in the top surface of the overall valve assembly. Operation of the valve assembly illustrated by FIGS. 8A–8B, 11A–11C, and 12–15 is the same as that previously discussed with respect to FIGS. 1–7.

Figure 15:
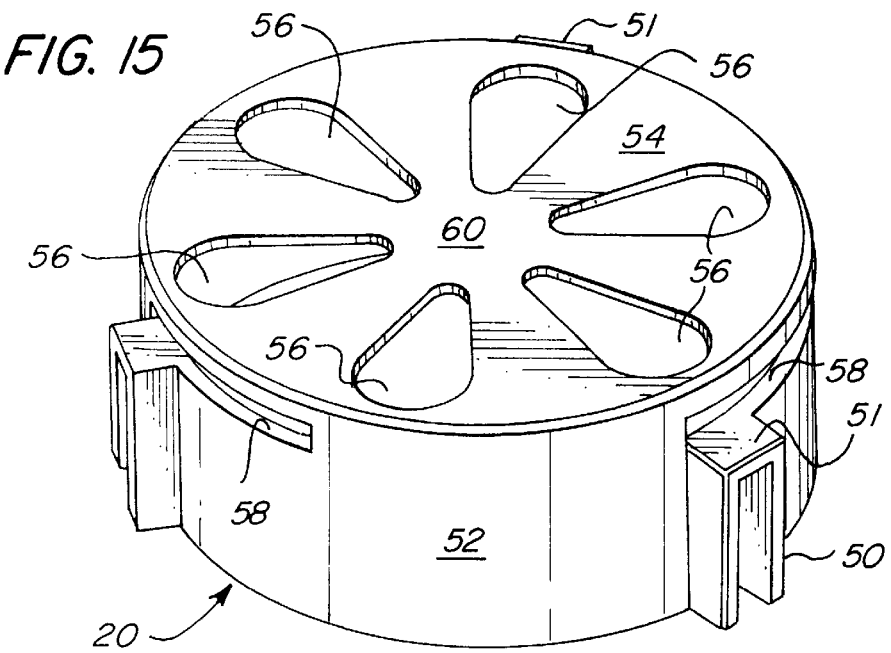
FIG. 15 is a perspective view of a valve cap mountable over the valve housing illustrated by FIG. 14.
Figure 16:
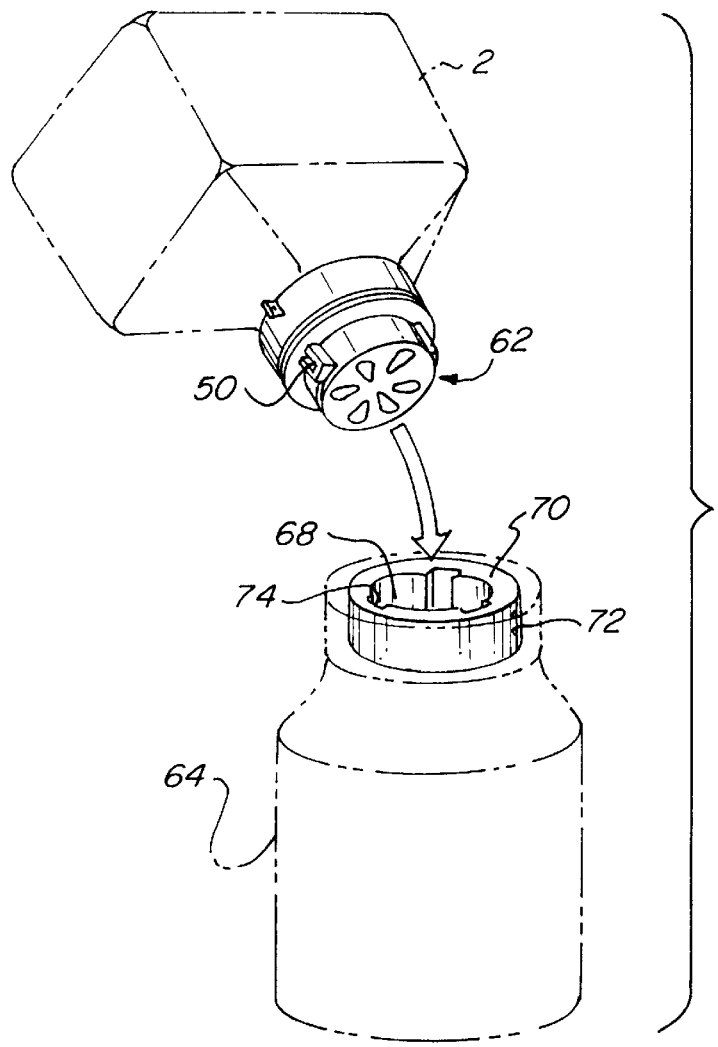
FIG. 16 is a perspective view schematically illustrating the relationship between a container with a valve assembly in accordance with the second embodiment of the present invention, and a receptacle having an inlet collar in accordance with the second embodiment of the present invention for receiving the contents of the container.

Still referring to the valve assembly illustrated by FIGS. 8A–8B, 11A–11C, and 12–17, as a result of the equidistant orientation of the corresponding six openings 40 and 56, the valve assembly is movable from its closed position (FIGS. 8A and 12) into its opened position (FIGS. 8B and 13) by rotation of the valve housing 22 relative to the valve cap 20 by only 30 degrees, and not 90 degrees as required by the previously discussed embodiment of the invention. The top surface of the valve assembly, as a result of the six openings defined therein, has a higher proportion of openings relative to overall surface area (as compared to the prior embodiment discussed herein) thereby tending to prevent accumulation of product residue on the closed portions of the top surface of the valve assembly after product has been discharged from the container to which the valve assembly is coupled. The three tabs 46 are received in three separate slots of equal length defined in the outer surface of the valve cap proximate to the top thereof, assuring that the stop means provided by the tabs and slots will more accurately and precisely limit relative rotation of the valve components, thereby more exactly aligning the six corresponding openings 40 and 56 in the maximum opened valve position, and more exactly offsetting the corresponding six openings in the maximum closed valve position. The provision of three separate tabs 46 equidistantly spaced along the circumference of the top surface of the valve housing, tends to more securely retain the valve cap mounted over the valve housing as a result of the three separate areas of engagement. Additionally, as will be discussed below with respect to FIGS. 11A–11C, the three equidistantly spaced tabs carried by the rotatable valve housing lock the valve assembly to a retaining collar of a receptacle at three separate engagement positions to securely retain the valve assembly and prevent removal thereof from the retaining collar when the valve is rotated into an opened position. In the second embodiment of the invention, as best illustrated by FIGS. 12, 13 and 15 the slots 58 are defined completely in the outer surface of the upper portion of the valve cap. This is a modification from the first embodiment of the invention, as best illustrated by FIGS. 3, 4 and 6, in which the slots are formed between a cut-out portion of the top of the valve cap and the periphery of the top surface of the valve housing.

Referring now to FIG. 9 directed to the first embodiment of the invention as shown by FIGS. 3–6, the container 2 is illustrated with the valve assembly generally designated by reference numeral 62 mounted to the container nozzle over the container discharge outlet (See FIG. 1). As discussed, the valve assembly 62 comprises the valve housing 22 and the valve cap 20 rotatably mounted thereon. A receptacle 64 includes an upper neck portion 66 defining an inlet opening 68. A collar 70 is fixedly mounted within the neck portion of the receptacle, as for example by riveting the collar to the neck as illustrated by reference numeral 72. The collar 70 has an opened central region defining the inlet opening 68 of the receptacle. As will be discussed in greater detail below, the collar also defines one or more vertical grooves 74 which complement the ribs 50 defined on the valve housing (See FIG. 6) of the valve assembly 62. In this manner, the container 2 can be inverted, and the valve assembly 62 is guided into and removably receivable within the collar 70 of the upright receptacle 64 by aligning the ribs 50 of the valve assembly 62 with the corresponding vertical grooves 74 defined in the inner surface of the collar 70.

FIG. 10 illustrates an embodiment of the collar 70 in accordance with the first embodiment of the invention, generally shown in FIG. 9. The collar 70 defines two vertical grooves 74 which are diametrically opposed to each other. An upper flange 76 is connected to a lower flange 78 by a sidewall 80. Two opposed vertical members 82 extend between the upper and lower flanges 76 and 78. The vertical members 82 are diametrically opposed to each other and are interspersed between the vertical grooves 74. Each of the vertical members 82 defines openings 84 for mounting the collar 70 to the neck of the receptacle 64 as illustrated in FIG. 9.

Operation of the container system in accordance with the first embodiment of the invention and described with respect to FIGS. 1–7 and 9–10 will now be discussed as follows. A clock spring or other resilient element is placed within the central opening 24 defined in the upper surface 38 of the hub section 21 of the valve housing 22 (FIG. 5). The valve cap 20 (FIG. 6) is rotatably mounted over the hub section 21 of the valve housing so that the center section 60 of the top surface 54 of the valve cap 20 closes the central opening 24 in the hub of the valve housing. The resilient element biases the valve assembly into the closed position illustrated by FIG. 3 in which the openings 40 and 56 defined, respectively, in the top surfaces of the valve housing and valve cap are offset and completely out of alignment and the top surface of the overall valve assembly is closed. Element 42 (FIG. 7) is thereafter mounted in each of the vertical grooves 28 on the sidewall of the hub 21 of the valve housing such that the horizontal tab portion 46 is oriented to extend in an outward direction, and is received in the circumferential slot or groove 58 defined between the top surfaces of the valve cap 20 and the valve housing 22. The valve cap is mounted to the hub of the valve housing so that selective relative rotation between the valve housing and the valve cap is possible. The horizontal tab 46 cooperates with the ends of the circumferential groove 58 to limit rotation of the valve housing relative to the valve cap between the fully closed valve position illustrated by FIG. 3 in one direction, and the fully opened valve position illustrated by FIG. 4 in the opposite direction. Means, as for example, an O-ring, can be provided to seal the interface regions between the valve cap and the valve housing.

After the valve cap has been mounted to the valve housing such that valve housing is rotatable relative to the valve cap, the completed valve assembly, preferably in the closed valve position illustrated by FIG. 3, is fixedly mounted to the nozzle 4 of the container 2 over the discharge outlet 8 (See FIG. 1). The valve assembly is removably mounted to the container 2 by rotating the valve assembly relative to the nozzle 4 so that the threads 6 on the nozzle engage the complementary threading internally defined in the inner surface of the wider flange portion 36 of the valve housing 22 (See FIG. 5). The valve assembly is rotatable relative to the container by gripping the tabs 32 extending from the valve housing (See FIG. 5) and turning it relative to the nozzle of the container while holding the container in a fixed position. When the valve assembly is initially mounted to the nozzle of the container in the closed valve position illustrated by FIG. 3, each horizontal tab portion 46 of each element 42 is oriented directly above and in alignment with the top surface of one of the vertical ribs 50 extending outwardly from the outer surface 52 of the valve cap 20.

When the valve assembly is mounted to the nozzle of the container, the container and the valve housing 22 are conjointly simultaneously movable relative to the valve cap 20. This occurs because the valve housing is fixedly (and removably) mounted to the container by threading (or other suitable means), and the valve cap is mounted to the valve housing so that the valve housing (and thus the container on which the valve housing is fixedly mounted) is rotatably movable relative to the valve cap.

The container 2 includes liquid or granular products therein to be supplied to a receptacle 64 (See FIG. 9). The receptacle comprises storage means for equipment adapted to disperse the products supplied from the container, as for example, a backpack with a discharge hose worn by an agricultural worker. The container 2, with the valve assembly mounted to the nozzle 4 biased in the closed position as illustrated by FIG. 3, is inverted so that the discharge nozzle faces downwardly. Since the valve is in a closed position, no material is discharged through the discharge outlet 8 of the container. The valve assembly is inserted into the inlet opening in the neck portion 66 of the receptacle 64, as schematically illustrated by FIG. 9. The ribs 50 on the valve cap and the horizontal tabs 46 which are oriented in alignment with the top of the ribs 50 when the valve is in its closed position, are received in the complementary configured vertical groove 74 defined in the inner surface of the collar 70 of the receptacle 64. The valve assembly is inserted into the collar until the wider flange portion 23 of the valve housing abuts against the upper surface of the collar 70, as for example, against the top flange 76 of the collar as illustrated by FIG. 10. The valve assembly and collar are arranged such that when the valve assembly is fully received in the collar, the horizontal tab 46 extends through the vertical groove 74 and below the bottom of the collar, as for example, below the bottom of lower flange portion 78 as illustrated by FIG. 10. The ribs 50 extending outwardly from the valve cap 20 are retained within the vertical grooves 74 of the collar 70. The valve assembly remains in its closed position, as illustrated by FIG. 3. When the embodiment of the valve assembly illustrated by FIGS. 8A and 8B is employed, the collar 70 illustrated by FIGS. 9 and 10 is modified to define three equidistantly spaced vertical grooves 74 corresponding to and complementing the three equidistantly spaced ribs 50 receivable in the grooves 74. Also see FIGS. 11A–11C (to be discussed below) illustrating a modified embodiment of the collar 70 defining three vertical grooves.

The container is now rotated relative to the collar in a first direction causing the valve assembly to open. The rotation of the container causes conjoint rotation of the valve housing in the same direction as the container because the valve housing is threaded to the nozzle of the container. Since the horizontal tab 46 fixedly mounted to the valve housing extends through the vertical groove 74 and beneath the lower surface of the collar when the valve assembly is fully received in the collar, the tab 46 is oriented below the bottom of the vertical groove 74 in the collar and thus is not retained in the groove. Accordingly, the vertical groove 74 does not restrict rotation of the tab 46, which is movable beneath the collar (e.g., beneath the lower flange 78) as the container (and the conjointly movable valve housing and tab 46 carried by the valve housing) is rotated relative to the collar. However, the valve cap 20 remains fixedly positioned relative to the stationary collar and does not rotate with the container and valve housing because the vertical ribs 50 extending from the outer surface of the valve cap are fixedly retained within the complementary vertical grooves 74 of the stationary collar 70 as the container and valve housing are conjointly rotated relative to the collar. Accordingly, the valve cap remains fixedly retained within the collar 70, which itself is fixedly mounted to the neck of the receptacle 64, as the container and valve housing are rotated relative to the stationary collar and the valve cap fixedly retained therein.

Conjoint rotation of the container and valve housing in a first predetermined direction relative to the fixedly positioned valve cap causes the valve to open. This occurs because the openings 40 and 56 in the top surfaces of the valve housing and valve cap, respectively, are moved from the closed valve position of FIG. 3 in which the openings are completely out of alignment with each other and the top surface of the valve assembly is closed, into a position in which the openings on the top surfaces are in alignment (as illustrated by FIG. 4) or partial alignment thereby providing openings in the top surface of the overall valve assembly. The tabs 46 and the ends of the circumferential grooves 58 of the valve assembly cooperate to provide stop means for limiting maximum rotation of the valve housing relative to the valve cap in both first and second opposed directions for opening and closing the valve assembly. Preferably, the valve assembly is designed such that relative movement of the valve housing to the valve cap by 90° in a first predetermined direction causes the valve to fully open, and relative rotation of the valve housing relative to the valve cap by 90° in the opposed direction causes the valve to completely close. Rotation of the valve housing relative to the valve cap an intermediate angular distance of less than 90° results in partial opening of the valve as a result of partial alignment of the corresponding openings in the top surfaces of the valve housing and the valve cap, respectively.

When the valve assembly is received in the collar of the receptacle and rotated in a direction to cause the valve to open, the contents within the inverted container flow into the lower receptacle through the opened, or partially opened, valve by gravity feed. When the valve assembly is received in the collar of the receptacle and rotated any angular distance relative to the fixed collar (and to the valve cap fixedly retained in the collar), the tab 46 carried by the rotatable valve housing is simultaneously rotated out of alignment with the vertical groove 74 in the collar and beneath the lower surface of the collar (e.g., beneath the bottom surface of the lower flange 78). Accordingly, the valve assembly is locked in the collar and cannot be removed from the collar even if an attempt is made to retract the container from the receptacle. As a result of the engagement between the tab 46 and the lower surface of the collar 70 when the valve is rotated into either a partial or fully opened position, the container can be removed from the receptacle only when the valve is in a fully closed position.

To remove the container from the receptacle, the container is rotated a maximum relative distance in the opposite direction relative to the collar and the valve cap fixedly retained in the collar. This relative rotation moves the tab 46, which is rotatable with the valve housing and container, into alignment with the vertical groove 74 in the collar and the rib 50 of the valve cap retained in the vertical groove. As a result of the alignment of the tab 46 with the vertical groove 74, the valve assembly can be removed from the collar by retracting the container. Since the valve assembly can be removed from the collar only when the tab 46 is completely aligned with the groove 74 and the rib 50 of the valve cap retained in the groove, and since the valve assembly is arranged such that this alignment only occurs when the valve is in a fully closed position, the valve assembly can only be removed from the collar when the valve is in a fully closed position. Likewise, the valve assembly can only be inserted into the collar when the valve is in the same fully closed position. Therefore, the overall system is designed such that the valve is fully or partially opened only when the container is fully received and seated in operational relationship within the receptacle. Moreover, until the valve is completely seated in the collar 70 such that the top surface of the wider flange portion of the valve housing abuts against the top surface of the collar, it is not possible to open the valve because the tab 46 carried by the valve housing remains in the groove 74 of the collar and prevents the rotation of the valve housing (and the attached container) relative to the fixed collar (and to the valve cap fixedly retained in the collar) which is required to open the valve. This occurs as a result of the arrangement of the valve housing and the collar by which the dimensions of these components are selected so that the tab 46 carried by the valve housing extends through the vertical groove in the collar and beneath the lower surface of the collar only when the valve housing is fully seated in a predetermined operational position relative to the top surface of the collar.

Operation of the second embodiment of the invention, illustrated by FIGS. 8A–8B, 11A–11C and 12–17 is substantially identical to the operation of the first embodiment of the invention illustrated by FIGS. 3–7, and 9–10 discussed above. The same reference numerals are used in FIGS. 8A–8B, 11A–11C and 12–17 to designate corresponding elements illustrated in FIGS. 3–7 and 9–10. The collar 70 illustrated by FIG. 11 includes three equidistantly spaced vertical grooves 74. The lower portion of each vertical groove merges with a horizontally extending arcuate channel segment 86 extending around a portion of the collar 70 proximate to the periphery thereof. The three vertical channels 74 are adapted to receive three corresponding, complementary ribs of a valve assembly, such as ribs 50 of the valve assembly illustrated by FIGS. 8A–8B, 12–13 and 15. The valve assembly and collar are arranged such that when the flange portion of the valve housing is flush against the top surface 88 of the collar and each of the ribs 50 is received in a different corresponding vertical groove 74, each of the rotatable tabs carried by the valve housing 22, which are aligned with the ribs 50 in the closed position of the valve when the valve assembly is received in the collar 70, is co-planar with a horizontal channel 86 extending from a vertical groove 74. Moreover, the collar and the valve assembly are arranged to cooperate with each other such that when the valve assembly is received in its operating position within the collar as described herein, the three circumferential slots 58 defined in the top surfaces of the valve cap 20, are in registration with the three horizontal channels 86 defined in the collar 70. Preferably, the horizontal slots 58 and the channels 86 are each of the same length.

When the valve assembly is received in its operating position within the collar 70 (See FIGS. 16 and 17), the valve is in a closed position in which each horizontal tab 46 is in alignment with a corresponding rib 50 (See FIGS. 8A and 12). As discussed herein, each rib 50 is fixedly retained in a vertical channel 74 of the collar so that the valve housing 22 is selectively rotatable relative to the valve cap 20 in a predetermined direction to open the valve assembly. Each tab 46 rotatable with the valve housing is co-planar with a different one of the horizontal channels 86 extending from each vertical groove 74 of the collar 70. When the valve housing and the three tabs carried thereon are rotatable in the predetermined direction to open the valve, the tabs 46 are received within the horizontal channels 86. Accordingly, the valve assembly is securely locked internally within the collar 70 when the valve is in any position other than fully closed. The valve assembly can only be retracted and removed from the collar when the tabs 46 are rotated in an opposite direction out of the horizontal channels 86 and into alignment with the vertical grooves 74, which corresponds to the fully closed position of the valve.

Figure 17:
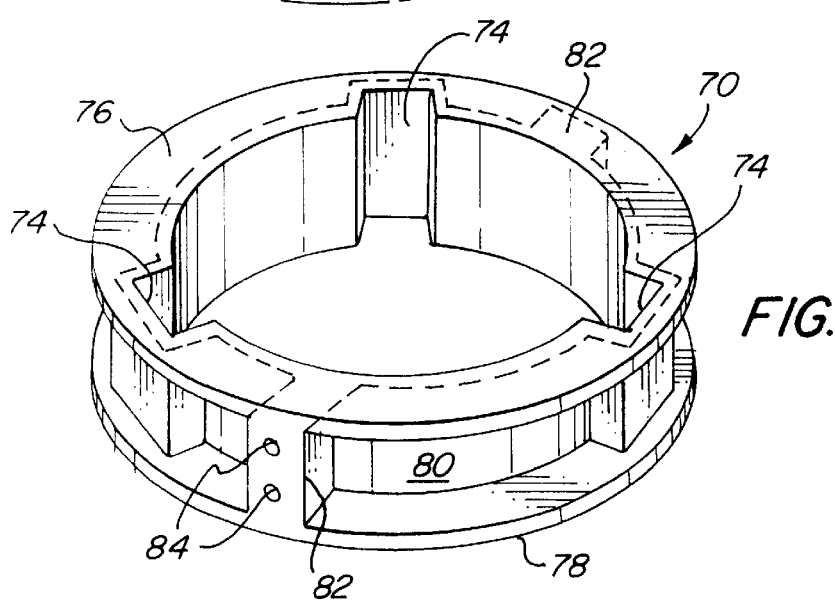
FIG. 17 is a perspective view of the collar mounted to the inlet of the receptacle illustrated by FIG. 16 in accordance with the second embodiment of the present invention.

Still referring to FIG. 11, reference numeral 88 represents the top surface of the collar 70, reference numeral 90 represents the bottom surface of the collar 70, and reference numeral 92 represents a vertical sidewall of the collar 70 extending between the upper and lower surfaces 88 and 90, respectively. Unlike the embodiment of the collar 70 illustrated by FIGS. 10 and 17, FIG. 11 illustrates a still further embodiment of a collar in accordance with the present invention which does not require that the vertical grooves 74 extend completely through the upper and lower collar surfaces, and does not require the upper and lower collar surfaces to be formed as flanges. Moreover, the collar of FIG. 11 locks the valve assembly internally within the collar and does not require the rotatable tab 46 of the valve housing to extend below and engage the lower surface of the collar when the valve is rotated out of its closed position.

The container 2 in accordance with the present invention is preferably formed from a rotational molding process. The materials from which the container is formed preferably include lightweight and durable plastics, such as polystyrene.

In the preferred embodiments of the invention, the container 2 includes at least one tab 12 extending from the outer surface thereof, the tab defining a central opening 14 therein. The opening in the tab is adapted to receive a hook or other supporting element for suspending and/or transporting the container from one location to another by a cable or pulley type transportation system. Similarly, in the preferred embodiments of the invention, the valve housing 22 includes at least one tab 32 extending outwardly therefrom, said tab defining an opening 34 therein. This tab may be used to transport the valve housing, when the valve assembly is removed from the container, from one location to another, in the same manner as discussed above with respect to the container. Additionally, the tab 32 on the valve housing provides gripping means for rotating the valve housing relative to the nozzle of the container to mount and dismount the valve assembly onto and off of the container.

It is noted that in the preferred embodiments of the invention discussed herein, the tab 46 performs four separate functions. The tab retains the valve cap 20 mounted to the valve housing 22 of the overall valve assembly. The tab 46 also provides stop means for limiting the maximum angular rotational displacement of the valve housing relative to the valve cap to open and close the valve assembly. The tab 46 provides locking means permitting the valve assembly to be received in and removed from the collar in the receptacle only when the valve is in a closed position. The tab 46 also cooperates with the collar in the receptacle to prevent rotation of the valve into an opened position until the valve assembly is fully seated in a predetermined operating position in the collar in the receptacle.

The description of the preferred embodiments of the invention discussed herein are intended to be illustrative only, and not restrictive of the scope of the invention. Further modifications, which will be apparent to those skilled in the art, are within the scope of the invention. For example, the collar in the receptacle can be formed in different configurations than that shown in the drawing, and the number, shape and size of the openings in the valve housing and valve cap, and the number of circumferential slots defined between the valve housing and valve cap, can differ from that illustrated in the drawings and discussed herein. Accordingly, the scope of the present invention is defined by the following claims and all equivalents thereto.

What is claimed is:

1. A valve assembly comprising a first valve component, a second valve component mounted to said first valve component, means for rotating said first valve component relative to said second valve component for selectively moving said valve assembly between a closed position and an opened position; a guide element extending from one of the first and second valve components for guiding said valve assembly into retaining means for said valve assembly; and means for removably mounting said valve assembly to a discharge opening of a container such that said container and said first valve component are conjointly rotatable relative to said second valve component; wherein said first valve component comprises a flange portion and a hub portion extending from said flange portion, said hub portion being narrower than said flange portion; said second valve component defining a top wall and a sidewall extending downwardly and oriented substantially perpendicular to said top wall; said guide element extending from said sidewall and comprising at least one rectangular shaped rib extending longitudinally along said sidewall and oriented substantially perpendicular to said top wall.

2. The valve assembly as claimed in claim 1 wherein said guide element is adapted to be received in said retaining means for retaining said second valve component fixedly positioned relative to said first valve component, such that rotation of said first valve component relative to said second valve component moves said valve assembly between said closed and opened positions.

3. The valve assembly as claimed in claim 1 wherein said first valve component has a top surface defining at least one opening therein; said second valve component has a top surface defining at least one opening therein; said openings in said top surfaces of said first and second valve components being selectively movable into and out of alignment as said first and second valve components are rotated relative to each other for moving said valve assembly between said closed and open positions.

4. The valve assembly as claimed in claim 2 wherein said first and second valve components are arranged in said valve assembly such that at least one slot is defined proximate to the top of said second valve component when said first and second valve components are rotatably mounted to each other; and stop means operatively associated with said slot to limit relative rotation of said first and second valve components.

5. The valve assembly as claimed in claim 4 wherein said slot is defined such that the length thereof limits maximum relative rotation of said first and second valve components to a fully opened position in which said openings in said top surfaces of said first and second valve components are in complete alignment of said valve assembly in a first rotational direction, and limits maximum relative rotation of said first and second valve components to a fully closed position in which said openings in said top surfaces of said first and second valve components are completely out of alignment in a second rotational direction opposite to said first rotational direction.

6. The valve assembly as claimed in claim 4 wherein said stop means includes an element carried by said first valve component and rotatable therewith, at least a portion of said element being received in said slot.

7. The valve assembly as claimed in claim 6 wherein said element further provides retaining means for securing said second valve component mounted to said first valve component for preventing linear displacement of said second valve component relative to said first valve component.

8. The valve assembly as claimed in claim 1 wherein said second valve component is adapted to be mounted over said hub portion of said first valve component.

9. The valve assembly as claimed in claim 3 wherein the top surfaces of both said first and second valve components define more than two openings therein.

10. The valve assembly as claimed in claim 9 wherein said top surfaces of said first and second valve components each defined at least six equidistantly spaced openings, said openings in said respective top surfaces being arranged and oriented such that said valve assembly is movable between said closed and opened positions by relative rotation of said first and second valve components not exceeding 30 degrees.

11. A system for transferring product between a container and a receptacle, said system comprising:

a container having a discharge opening, and a valve assembly removably mountable over said discharge opening;

said valve assembly comprising first and second valve components mounted for selective rotation relative to each other in first and second predetermined directions for moving said valve assembly between closed and opened positions;

said valve assembly being removably mountable to said container such that said first valve component is conjointly rotatable with said container relative to said second valve component;

said valve assembly including a guide element extending from said second valve component, said second valve component comprising a top wall and a sidewall extending downwardly and substantially perpendicular to said top wall, said guide element comprising at least one rectangular shaped rib extending longitudinally along said sidewall and oriented substantially perpendicular to said top wall;

said at least one rectangular rib adapted to be received in a collar fixedly mounted in an inlet opening of a product receptacle;

said at least one rectangular rib extending from said valve assembly for fixedly retaining said second valve component in said collar such that conjoint rotation of said container and said first valve component relative to said second valve component and said collar of said receptacle moves said valve assembly between said closed and opened positions.

12. The system as claimed in claim 11 wherein said collar defines at least one continuous vertical groove for receiving said at least one rectangular rib to retain said second valve component in a fixed position relative to said collar when said valve assembly is received in said collar.

13. The system as claimed in claim 11 wherein said first valve component defines a flange portion adapted to be seated on a top surface of said collar when said valve assembly is received in said collar in a predetermined operating position.

14. The system as claimed in claim 11 wherein said collar in said receptacle comprises an upper flange, a lower flange, and a sidewall connecting said upper and lower flanges.

15. The system as claimed in claim 14 wherein said upper and lower flanges define aligned grooves for receiving said guide element carried by said valve assembly.

16. The system as claimed in claim 15 wherein said sidewall of said collar defines a channel, said channel being in alignment with said grooves defined in said upper and lower flanges so as to define a continuous passageway through said collar to receive said guide element carried by said valve assembly.

17. A system for transferring product between a container and a receptacle, said system comprising:

a container having a discharge opening, and a valve assembly removably mountable over said discharge opening;

said valve assembly comprising first and second valve components mounted for selective rotation relative to each other in first and second predetermined directions for moving said valve assembly between closed and opened positions;

said valve assembly being removably mountable to said container such that said first valve component is conjointly rotatable with said container relative to said second valve component;

said valve assembly including a guide element extending from one of the first and second valve components;

said guide element adapted to be received in a collar fixedly mounted in an inlet opening of a product receptacle;

said guide element extending from said valve assembly for fixedly retaining said second valve component in said collar such that conjoint rotation of said container and said first valve component relative to said second valve component and said collar of said receptacle moves said valve assembly between said closed and opened positions; and a tab carried by said first valve component and movable with said first valve component as said container and said first valve component are rotated conjointly relative to said second valve component fixedly retained in said collar of said receptacle; said tab and said collar being operatively associated with each other such that rotation of said container relative to said receptacle in a first predetermined direction to open said valve assembly causes said tab to cooperate with said collar for preventing said first valve component from being retracted from said collar when said valve assembly is in said opened position.

18. The system as claimed in claim 17 wherein said guide element includes a rib extending from said second valve component, said tab element on said first valve component cooperating with said rib on said second valve component such that said tab and said rib are in alignment with each other when said valve assembly is in said closed position, said valve assembly and said collar cooperating with each other such that said valve assembly is receivable in and removable from said collar only when said tab and said rib are in alignment so that said valve assembly is in said closed position.

19. The system as claimed in claim 17 wherein said tab engages said collar by rotating beneath a lower surface of said collar.

* * * * *